2,878,250

Patented Mar. 17, 1959

2,878,250
PREPARATION OF MONO-SUBSTITUTED s-TRIAZINES

Frederic C. Schaefer, Darien, Conn., assignor to American Cyanamid Company, New York, N. Y., a corporation of Maine No Drawing. Application July 19, 1957
Serial No. 672,869

5 Claims. (Cl. 260—248)

This invention relates to an improved process for preparing mono-substituted triazines. More particularly, it relates to a new and novel reaction of s-triazine with any of a variety of imidate compounds to recover a mono-substituted triazine.

To the present, a satisfactory method for preparing a mono-substituted triazine has not been reported. Tedious procedures have been suggested, but none has been proven wholly satisfactory. For instance, in an involved three step synthesis, cyanuric chloride has been initially reacted with a Grignard reagent, such as phenyl magnesium bromide, to form 2-phenyl-4,6-dichloro-s-triazine. The latter is then reacted with sodium hydrosulfide. Finally, resultant 2-phenyl-4,6-dimercapto-s-triazine is treated with hydrogen in the presence of nickel to prepare monophenyl s-triazine.

The above procedure, which is representative of a good prior practice, is laborious, time-consuming and expensive. Accordingly, it does not lend itself to commercial exploitation.

It is a principal object of the present invention to provide a novel method for preparing mono-substituted s-triazines in a more direct manner. Another object is to provide a novel method for preparing mono-substituted triazines directly from an unsubstituted s-triazine and a basic imidate compound. Other objects and advantages will become apparent from the ensuing detailed description.

It has been found that unexpectedly s-triazine can be reacted with basic imidates of $pK_b$ value equal to less than 11. Thus, mono-substituted s-triazine derivatives can be prepared directly. The preparation of the latter is surprising, due to the known sensitivity of the unsubstituted s-triazine ring to nitrogen bases. The latter bases ordinarily cause ring degradation. For example, it has been reported in the Journal American Chemical Society 77, 6559 (1955), and in the Journal Organic Chemistry 21, p. 1037 (1956), that the s-triazine ring is degraded by either aniline to give N,N'-diphenylformamidine or by ammonium chloride to give formamidine hydrochloride. Mono-substituted s-triazines are not formed in such degradation reactions. Nevertheless, according to the process of this invention, mono-substituted s-triazines are obtained in the presence of a basic imidate.

It is an advantage of the process of the invention that s-triazine may be reacted with an imidate compound in the presence or absence of an anhydrous alcoholic solvent to form the desired mono-substituted derivative. Where an anhydrous alcoholic solvent is used, it has been found that the reaction may be more quickly and efficiently carried out, particularly if small quantities of water or acid are added thereto. A typical reaction utilizing an imidate compound may be illustrated as follows:

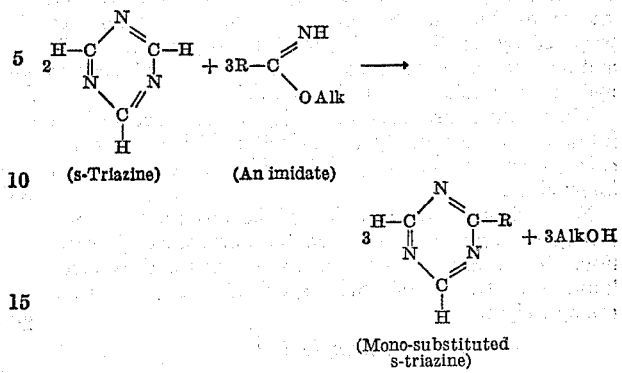

in which R is an organic radical such as alkyl, aryl and aralkyl and Alk is a lower alkyl radical, including methyl, ethyl and propyl. Mono-substituted s-triazine product may be recovered by conventional methods as distillation, crystallization and the like.

In the above recited equation, two moles of triazine are reacted with three moles of an imidate compound. However, an excess of either reactant can also be employed, although it is preferable to maintain an excess of the imidate compound. It has been further found that equimolar mixtures of the reactants can be employed, particularly where the imidate is an imidate hydrohalide. In general, the s-triazine-imidate reaction of the present invention can be conducted advantageously in the presence of an anhydrous alcoholic solvent. Illustrative of the latter is: methanol, ethanol, isopropanol or butanol. In practice, temperatures of between 25° C. and 80° C. are used. However, slightly elevated temperatures up to about 100° C., or higher, can also be used without adversely affecting yield of product.

As previously stated, small quantities of either water or an acid may be added to the anhydrous alcoholic solvent. In this manner, the process may be advantageously modified to the extent that yields of desired product improve substantially, while utilizing lower temperatures and reaction times. The acid contemplated includes a mineral acid, such as hydrochloric and hydrobromic acids, as well as a lower alkyl carboxylic acid, such as formic or acetic acid. The latter organic acid or water additive may be present in an amount equal to from 0.001 to 0.25 mole per mole of the imidate reactant. Similarly, from 0.03 to 1 mole of the mineral acid per mole of imidate may be added to the solvent, whereby an imidate salt is formed in situ. Where one mole of the mineral acid is used, it can be supplied if desired as the imidate salt.

Any of a large variety of imidate bases can be employed in the process of the invention. Typically illustrative imidate compounds having the

grouping in which Alk is a lower alkyl radical, include:

Ethyl acetimidate
Ethyl propionimidate
Ethyl butyrimidate

Methyl laurimidate
Methyl benzimidate
Ethyl m-nitro-benzimidate
Ethyl phenylacetimidate
Diethyl terephthalimidate
Ethyl p-chlorophenylacetimidate The foregoing imidate compounds may be used directly as their hydrohalide salts, such as the hydrofluoride, hydrochloride and hydrobromide.

Any of the above illustrative imidates, as well as the s-triazine reactant, can be prepared by methods well known to the art. For example, the imidate may be prepared by reacting a mixture of an appropriate nitrile and an alcohol in the presence of a mineral acid, such as hydrochloric acid or hydrobromic acid.

The products produced according to the process of the invention possess utility as agricultural biocidal chemicals. For example, they find utility as fumigants or insecticides.

For a clearer understanding of the invention, the following examples are presented for purposes of illustration. These are not intended to be construed as being limitative. Unless otherwise specified, the parts given are by weight.

Example 1

A mixture of ethyl acetimidate (0.066 mole) and s-triazine (0.044 mole) are heated at reflux and aliquots are taken at intervals for infra-red examination. Trace amounts of 2-methyl-s-triazine are evident after 4 hours of reaction. After 22 hours, the solution is found to contain a substantial amount of the latter mono-substituted triazine compound, which is recovered by fractional distillation, boiling at 125° C.–127° C. Its melting point is 50° C.

Example 2

The reaction mixture consisting of 17.4 parts ethyl acetimidate (0.20 mole) and 9.4 parts s-triazine (0.12 mole) is heated at reflux for 1.5 hours. No change, detectable by infra-red examination, occurred during this time. Anhydrous ethanol (5 cc.) is then added to the mixture and boiling is continued. After an additional 1.5 hours, 2-methyl-s-triazine is detectable by infra-red spectroscopy, and after an additional 6 hours, the original imidate compound has largely disappeared. Markedly increased quantities of 2-methyl-s-triazine are detected. Distillation of the reacted solution gives a recovery of 2.4 parts of the starting s-triazine and 6.5 parts of 2-methyl-s-triazine, the latter corresponding to a 60% yield.

Example 3

The reaction mixture containing 16.5 parts ethyl propionimidate (0.12 mole), 6.5 parts s-triazine (0.080 mole) and 8 parts absolute ethanol is refluxed for 4.5 hours. Fractional distillation then gives 4.3 parts 2-ethyl-s-triazine having a B. P. 50° C.–65° C. at 35 mm. Hg pressure.

Example 4

A reaction mixture comprising ethyl acetimidate (0.15 mole), s-triazine (0.050 mole) and absolute ethanol (2.00 part) is held at about 25° C. for 5 days. Thereafter, the presence of a small amount of 2-methyl-s-triazine is observed with the aid of infra-red spectroscopy. Then, 0.05 part water is added, and after an additional period of 15 days at 25° C. a mixture containing 2-methyl-s-triazine and s-triazine in a molar ratio of approximately 9 to 1 is obtained. The imidate reactant cannot be detected.

Example 5

| | | |
|---|---|---|
| Ethyl acetimidate | 0.66 mole | (58.0 parts). |
| s-Triazine | 0.33 mole | (27.0 parts). |
| Absolute ethanol | 0.26 mole | (13.2 parts). |
| Water | 0.03 mole | (0.54 part). |

A reaction mixture comprising the above is stored at 45° C. for 7 days. Spectroscopic examination of the solution at intervals shows the molar ratio of 2-methyl-s-triazine to s-triazine to change in the following sequence:

| | |
|---|---|
| 18 hours | 0.20 |
| 42 hours | 1.2 |
| 49 hours | 1.9 |
| 168 hours | 11.0 |

Fractional distillation of the resultant solution gives a yield of 27.5 parts (59%) 2-methyl-s-triazine.

Example 6

| | | |
|---|---|---|
| Methyl benzimidate | moles | 0.10 |
| s-Triazine | do | 0.050 |
| Absolute ethanol | cc | 2.5 |

The mixture specified above is refluxed for 4 hours. Infra-red examination shows that about 10% 2-phenyl-s-triazine is present at the end of this period. Further addition of 0.0015 mole of acetic acid and continued reflux for 8 hours leads to the substantially complete disappearance of methyl benzimidate. The reaction mixture is then drowned in water, and the product extracted with ether. Evaporation of the ethanol extract and distillation of the residue gives 7.5 g. of 2-phenyl-s-triazine, B. P. of approximately 105° C. at 2 mm. Hg pressure; M. P. 65° C., corresponding to a 64% yield.

Example 7

| | |
|---|---|
| s-Triazine | 0.10 mole (8.10 parts). |
| Anhydrous methanol | 0.01 mole (0.32 part). |
| Acetic acid | 0.025 mole. |

In a suitable vessel containing the above reagents, ethyl acetimidate (0.20 mole) is added dropwise during a period of 90 minutes at 50° C. The reaction solution is held at 50° C. for an additional hour and then is allowed to stand overnight at room temperature. The solution is then distilled as completely as possible at reduced pressure. The distillate is chilled to crystallize a portion (for instance, about 4.5 parts) of the s-triazine present. The mother liquor is then fractionally distilled at atmospheric pressure. Recovery of a small additional amount of unreacted s-triazine is had. This is followed by the collection of 2-methyl-s-triazine in approximately 50% yield.

Example 8

A mixture of s-triazine (0.20 mole) in 8 parts of absolute alcohol and 0.05 mole acetic acid is added to a suitable reaction vessel while maintaining the contents therein at a temperature of 50° C. Ethyl phenylacetimidate (0.30 mole) is next adding during a thirty minute period. The reaction mixture's temperature is increased to 80° C. and held for an additional forty-five minutes. By-product formamidine acetate crystallizes on cooling to room temperature. The product, 2-benzyl-s-triazine, is obtained by fractionally distilling the remaining liquor whereby 12 parts of 2-benzyl-s-triazine (boiling at 135° C.–145° C. at 25 mm. Hg pressure) are recovered.

Example 9

A mixture of ethyl-m-nitro-benzimidate (3 moles) and s-triazine (2 moles) is reacted for one hour at 80° C. in 400 parts ethanol containing 0.50 mole of acetic acid. The product, 2-(m-nitro-phenyl)-s-triazine is precipitated by dilution of the reaction medium with water. It has a melting point of 123° C.–125° C. after recrystallization from acetonitrile and the triazine is obtained in good yield.

Example 10

A mixture of diethyl terephthalimidate (0.015 mole), s-triazine (0.020 mole) and acetic acid (0.004 mole) in 8 parts absolute ethanol is heated to 80° C. for three hours. Resultant 2,2'-(p-phenylene)-ditriazine, having a melting point of 298° C.–299° C., is recovered by crystallization of the reaction mixture.

*Example 11*

A mixture containing ethyl acetimidate hydrochloride (0.50 mole), s-triazine (0.50 mole) and anhydrous isopropyl alcohol (50 cc.) is heated for one and one-half hours at 80° C. The reaction product is then distilled as completely as possible at low pressure and the distillate is fractionally redistilled. 14.7 parts 2-methyl-s-triazine is obtained. This corresponds to a 31% yield.

*Example 12*

| | | |
|---|---|---|
| Ethyl acetimidate hydrochloride | moles | 0.60 |
| s-Triazine | do | 0.20 |
| Absolute ethanol | cc | 20 |

The reaction mixture set forth above is heated for four hours while the temperature is gradually increased from 45° C. to 75° C. The volatile products are then stripped as completely as possible at reduced pressure and are fractionally redistilled. 18.5% of the starting triazine is recovered. 2-methyl-s-triazine (10.5 g.) is obtained in 68% yield and 2,4-dimethyl-s-triazine (1.9 g.) in 11% yield, based on the unrecovered s-triazine.

*Example 13*

An equimolar mixture of ethyl acetimidate hydrobromide and s-triazine in absolute alcohol is heated in a suitable vessel to a temperature of about 40° C. for forty-five minutes. The temperature is then increased to 80° C. for an additional forty-five minutes. When fractionally distilled, 2-methyl-s-triazine is recovered in good yield.

As previously stated, the 2-monosubstituted s-triazines obtained in accordance with the process of the present invention find utility as agricultural biocidal chemicals. As illustrative of the mono-substituted triazine, 2-phenyl-s-triazine is tested in the following manner.

*Example 14*

The compound, 2-phenyl-s-triazine, is applied as a 0.1% spray (in 65% acetone and 35% water) to nastrium aphids. A kill of more than 75% is observed.

*Example 15*

Lima bean plants are infested with two-spotted spider mite. These are dipped in a solution which is prepared by dissolving 0.1 part 2-phenyl-s-triazine in 65% acetone and 35% water. Thus, treated plants are observed for seven days. At the termination of the period, 90% kill of newly-hatched nymphs are noted.

I claim:

1. An improved method for producing mono-substituted s-triazines which comprises the steps of: reacting s-triazine with an imidate compound represented by the general formula:

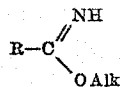

wherein R is selected from the group consisting of alkyl radicals containing from one to twelve carbon atoms, phenyl, chlorophenyl, nitrophenyl, terephthalic and benzyl, and Alk is a lower alkyl radical at a temperature within the range of from about 25° C. to about 100° C.; and recovering the resultant mono-substituted s-triazine from the reaction mixture.

2. The process according to claim 1 in which the reaction is carried out in an anhydrous alcoholic solvent.

3. An improved method for preparing 2-methyl-s-triazine which comprises: reacting s-triazine with ethyl acetimidate in an anhydrous alcoholic solvent at a temperature within the range of from about 25° C. to about 100° C., and recovering the resultant mono-substituted s-triazine from the reaction mixture.

4. An improved method for preparing 2-ethyl-s-triazine which comprises the steps of: reacting s-triazine with ethyl propionimidate in an anhydrous alcoholic solvent at a temperature within the range of from about 25° C. to about 100° C., and recovering resultant 2-ethyl-s-triazine from the reaction mixture.

5. An improved method for preparing 2-phenyl-s-triazine which comprises the steps of: reacting s-triazine with methyl benzimidate in an anhydrous alcoholic solvent at a temperature within the range of from about 25° C. to about 100° C., and recovering resultant 2-phenyl-s-triazine from the reaction mixture.

No references cited.